G. G. GILPIN.
RAILWAY CAR.
APPLICATION FILED NOV. 27, 1918.

1,348,991.

Patented Aug. 10, 1920.
10 SHEETS—SHEET 1.

Fig. 1.

Witnesses:
Inventor:
Garth G. Gilpin

G. G. GILPIN.
RAILWAY CAR.
APPLICATION FILED NOV. 27, 1918.

1,348,991.

Patented Aug. 10, 1920.
10 SHEETS—SHEET 2.

Witnesses:
W. F. Kilroy
Harry R. White

Inventor:
Garth G. Gilpin
By Barnett & Truman, Attys.

G. G. GILPIN.
RAILWAY CAR.
APPLICATION FILED NOV. 27, 1918.

1,348,991.

Patented Aug. 10, 1920.
10 SHEETS—SHEET 3.

G. G. GILPIN.
RAILWAY CAR.
APPLICATION FILED NOV. 27, 1918.

1,348,991.

Patented Aug. 10, 1920.
10 SHEETS—SHEET 6.

Witnesses:
W. P. Kilroy
Harry R. L. White

Inventor:
Garth G. Gilpin
By Barnett Truman
Attys.

G. G. GILPIN.
RAILWAY CAR.
APPLICATION FILED NOV. 27, 1918.

1,348,991.

Patented Aug. 10, 1920.
10 SHEETS—SHEET 9.

Witnesses:
W. F. Kilroy
Harry A. L. White

Inventor:
Garth G. Gilpin
By Barnett & Truman
Attys.

UNITED STATES PATENT OFFICE.

GARTH GRIFFITH GILPIN, OF RIVERSIDE, ILLINOIS, ASSIGNOR TO WALTER P. MURPHY, OF NEW YORK, N. Y.

RAILWAY-CAR.

1,348,991.     Specification of Letters Patent.     Patented Aug. 10, 1920.

Application filed November 27, 1918. Serial No. 264,349.

*To all whom it may concern:*

Be it known that I, GARTH G. GILPIN, a citizen of the United States, residing at Riverside, in the county of Cook and State of Illinois, have invented certain new and useful Improvements in Railway-Cars, of which the following is a specification.

My invention relates to railway cars, and particularly to the construction of the trucks and of the means for supporting the car body thereon.

The primary object of the invention is to provide certain novel constructions and arrangements of these elements of the car whereby the weight of the car may be reduced to a minimum and the running gear structures simplified and in other respects improved. In this connection the invention contemplates eliminating the usual body and truck bolsters, center plates and king pin construction and supporting the body of the car directly on the ends of the wheel axles, a single bolster being preferably employed, which may more properly be considered as a body bolster, and which serves to distribute the load of the car body to the sides of the truck and to the wheels instead of transmitting it to the center of the truck as is the case in cars of standard construction.

A further object is to provide a two-wheeled truck which will be suitable for ordinary railway service.

A further object is to provide a railway car truck which can be readily removed from the car, for the purpose of repair for example, by merely jacking up the body of the car.

Other incidental objects will appear from the following description of certain preferred embodiments of the invention illustrated in the accompanying drawings.

In the drawings.

Like characters of reference designate like parts in the several figures of the drawings.

Figure 14:
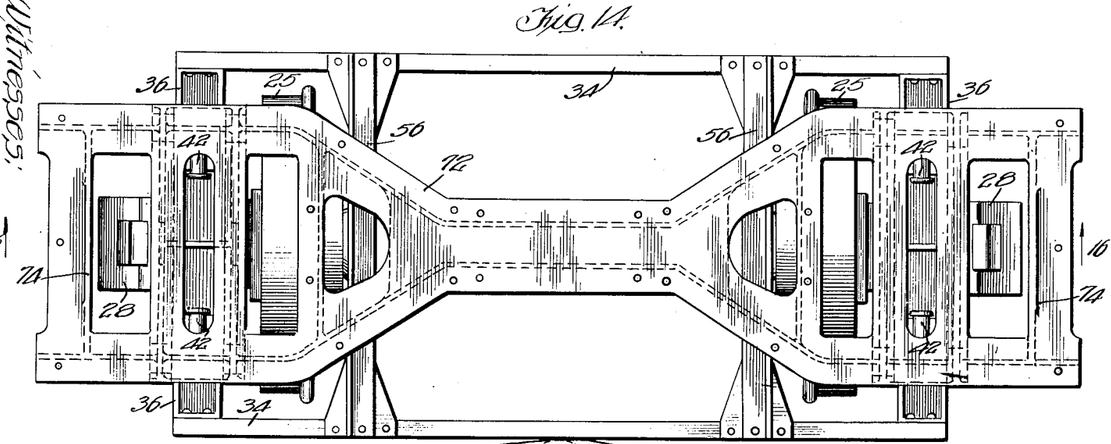
Fig. 14 is a view, similar to Fig. 10, showing a modified form of bolster.
Figure 15:
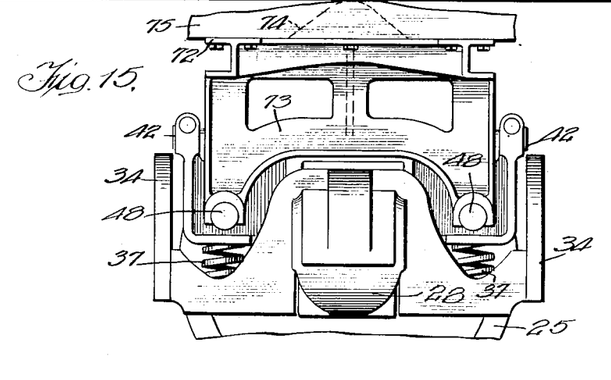
Fig. 15 is a fragmentary end elevation of the bolster and associated parts of the truck as shown in Fig. 14.
Figure 16:
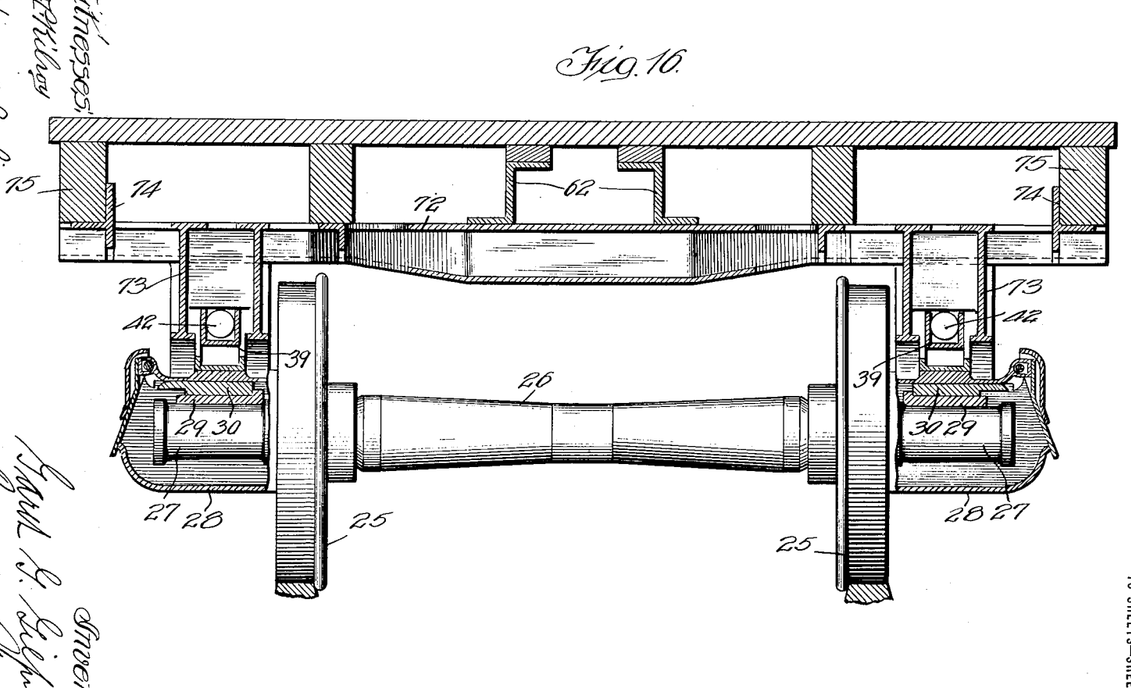
Fig. 16 is a sectional view on line 16—16 of Fig. 14.

Referring to the drawings, A indicates the body of a railway box car supported on two two-wheeled trucks B constructed in accordance with my invention. Interposed between the body of the car and each of these trucks is a transverse bolster C which is rigidly connected to the car and flexibly and elastically supported on the trucks. In Figs. 1 to 13 the bolster is a built-up metal structure consisting principally of commercial channel and angle bars cut, bent and riveted together. In Figs. 14, 15 and 16 the bolster is an integral cast structure.

In the drawings I have shown two slightly different truck constructions. The construction shown in Figs. 11, 12 and 13 differs from that shown in the preceding figures only in that certain parts manufactured as separate structures in the truck illustrated in Figs. 2 to 10 inclusive, are combined in integral structures in the modified form of the invention shown in Figs. 11, 12 and 13.

My invention departs from standard railway practice by employing a single bolster at each end of the car instead of the usual body and truck bolsters with their center plates and king pin. In the ordinary railroad car the truck and truck bolster pivot as a single structure on the king pin. The weight of the car is transmitted by the body bolster to the center plate of the truck bolster and by the truck bolster is distributed to the wheels at opposite sides of the truck. This arrangement involves making both body and truck bolsters very heavy, particularly at the middle. My invention proceeds upon an entirely different theory. The weight of the car body, instead of being carried to the center of the truck and then back to the wheels, is imposed directly upon the wheels, each wheel receiving one-fourth of the load (assuming that the car be provided with two two-wheeled trucks as shown and no part of the truck structure being subjected to a greater load than each wheel carries). Under these conditions the possibility of reduction of the weight of the car structure will be apparent. To give sufficient flexibility between the car body and running gear the opposite ends of the body bolsters, that is to say, the opposite sides of the car body at points above the wheels, are resiliently and flexibly supported on the wheel axles, that is, on the journal boxes, so that the car body has capacity for some movement in a longitudinal direction and also transversely, these movements being cushioned by the springs which are stressed when the movements take place.

Referring now to Figs. 2 to 10 inclusive, 25, 25 designate the car wheels of one of the trucks united by an axle 26 and provided with the usual journals 27, 27 which extend into journal boxes 28, 28 of any suitable type or construction. The brackets are shown at 29 and the wedges at 30.

In carrying out my invention in the form shown in these figures, I provide a saddle casting 31 for each journal box. The saddle casting fits over the journal box, the box being preferably formed with ribs 32 (Fig. 7) which engage with tongues 33 on the saddle casting to keep the latter in place on the box. The box is preferably formed with webs 32ᵃ to give additional strength against the thrust of the saddle casting and its load. The two saddle castings on opposite sides of the car are preferably united by arched members 34, the extremities of which are riveted to flanges 35 on the saddle castings. The saddle castings are formed to provide seats 36 for coiled springs. I preferably employ a heavy coiled spring 37 and a light coiled spring 38 on each side of the journal box.

Figure 9:
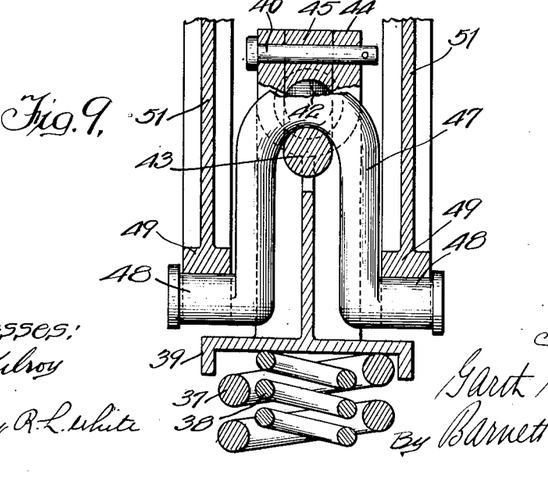
Fig. 9 is a fragmentary vertical sectional view on line 9—9 of Fig. 8.
Figure 10:
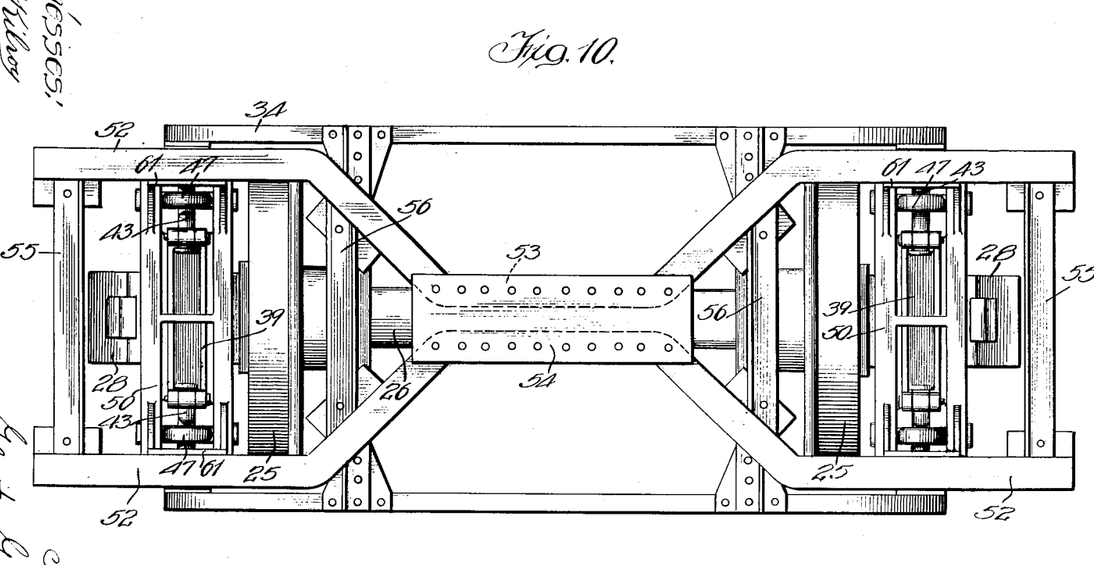
Fig. 10 is a plan view of the truck and bolster.

Mounted on the springs at each end of the truck is a vertical sliding member 39 formed with curved webs 40 which fit into channels 41 formed on the upright sides of the saddle casting 31. The sliding member 39 supports a pair of horizontally disposed hangers 42, one on each side of the journal box, these hangers being preferably provided with downwardly curved portions 43 and being journaled in U-shaped bearings 44 in the sliding member in which they are retained by bearing blocks 45 held in place by pins 46 (Fig. 9). The hangers 43 support a pair of vertical U-shaped hangers 47, the lower extremities of which are provided with outturned gudgeons 48 to engage with bearings 49 formed on a double bifurcated bracket 50 having two webs 51, 51 which straddle the hangers 47.

There are, of course, two of these bracket members 50 for each truck, one on each side of the car, and they may be connected directly to the car body. Preferably, however, they are arranged to project downwardly from opposite ends of the body bolster referred to, and designated generally by the letter C.

Figure 1:
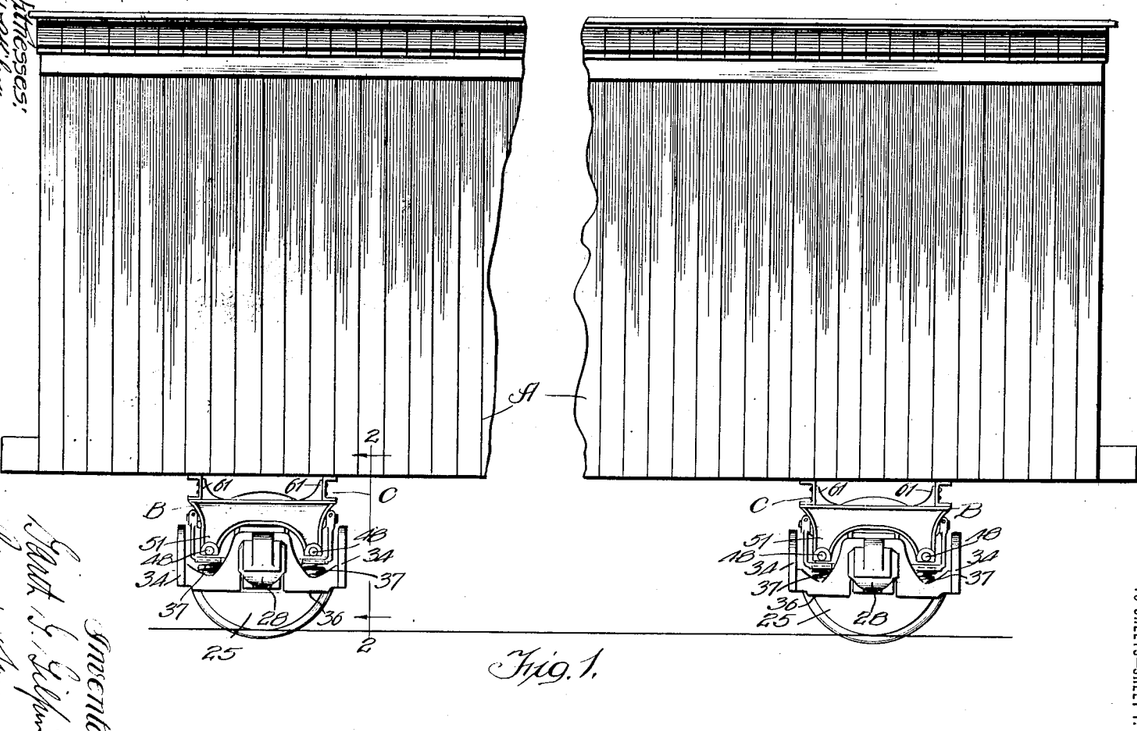
Figure 1 is a side elevation of a railway box car provided with two two-wheeled trucks constructed in accordance with the invention.
Figure 2:
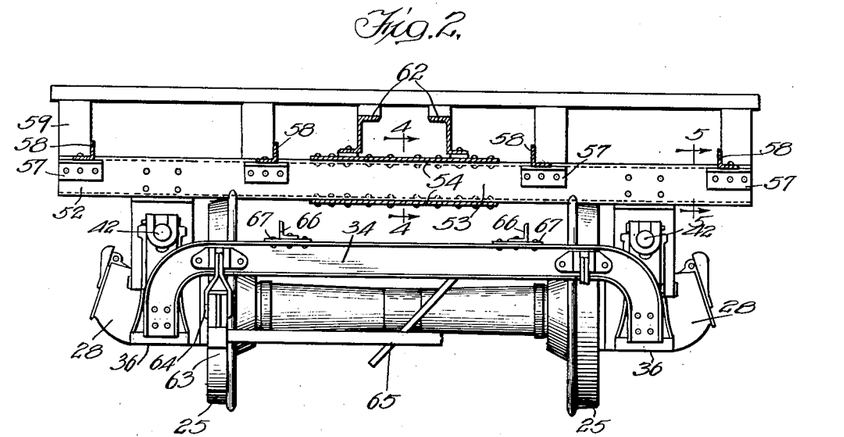
Fig. 2 is a sectional elevation on line 2—2 of Fig. 1, omitting the sheathing of the car.
Figures 3, 4, 5:
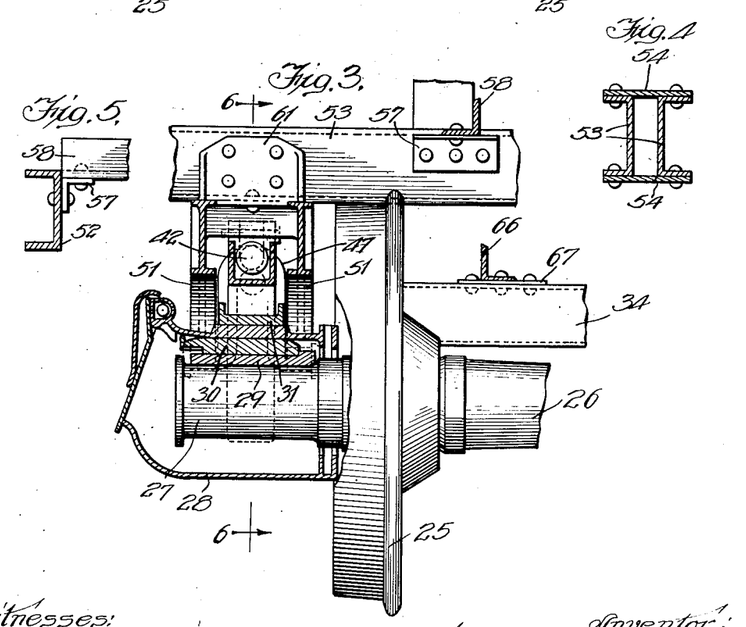
Fig. 3 is a cross sectional view of one end of one of the trucks and associated parts.
Figs. 4 and 5 are detail sectional views on lines 4—4 and 5—5, respectively, of Fig. 2.
Figure 6:
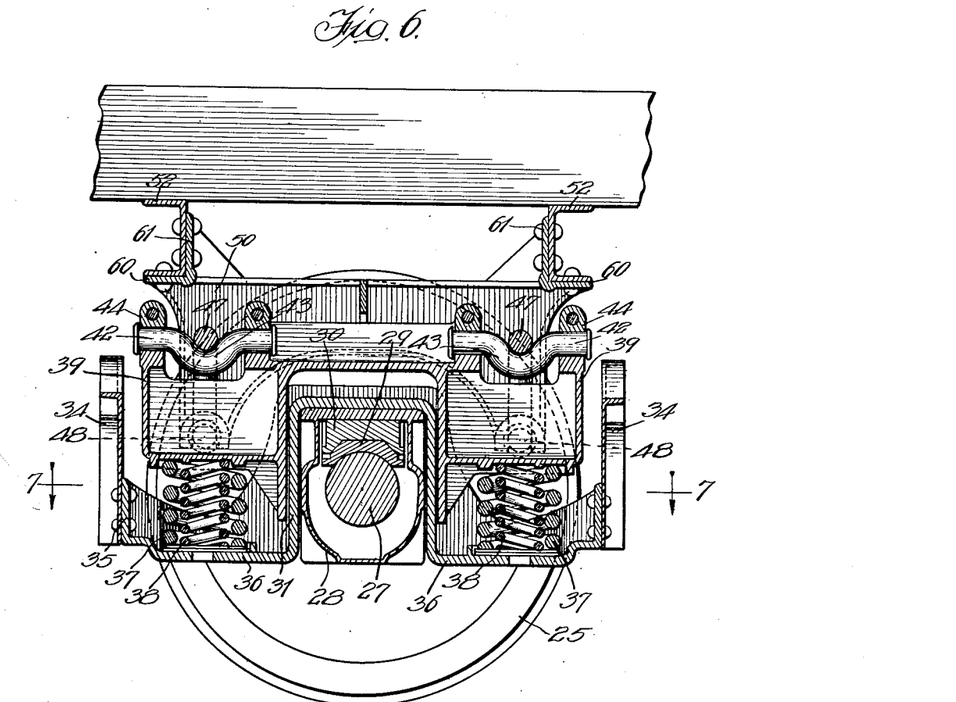
Fig. 6 is a sectional view on line 6—6 of Fig. 3 and Fig. 7, respectively.
Figure 7:
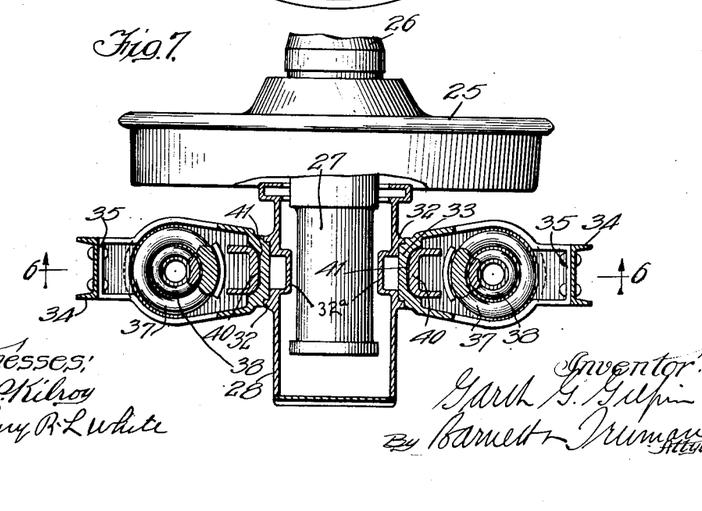
Fig. 7 is a sectional plan on line 7—7 of Fig. 6.
Figure 8:
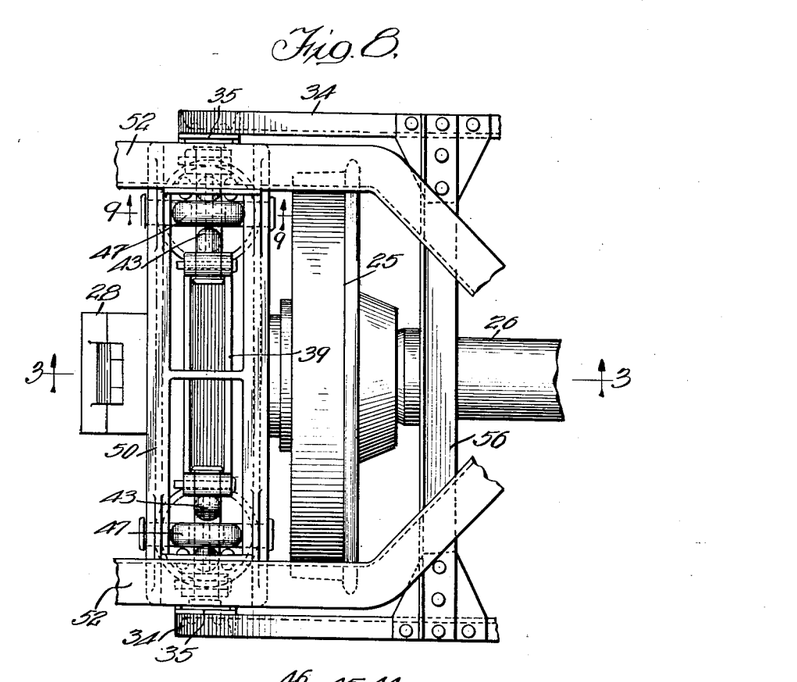
Fig. 8 is a fragmentary plan view of one of the trucks, a portion of the bolster being also indicated.

The built up form of bolster shown in these figures comprises a pair of channel bars 52, the middle portions 53 of which are bent so that they lie close to each other and are connected together by a pair of plates 54 (Fig. 4) and cross pieces 55, 56 which are preferably angle bars and are fastened to the channel bars 52 by means of angular brackets 57 (Fig. 5). These angle bars are turned in opposite directions on opposite sides of the car and their upstanding legs 58 form retainers for the longitudinal sills 59 of the car body (Fig. 2). The bracket members 50 above referred to are castings and are formed with angularly disposed webs 60, 61 which are riveted to the channel bars 52 of the body bolster. The draft sills of the car are attached to the bolster as shown at 62.

The brake shoes for the wheels are indicated at 63 and are supported from hangers 64 on one of the transverse members 34 above referred to. The brake beam is shown at 65 (Fig. 2). The transverse members 34 are preferably connected by longitudinal angle bars 66 which are attached to the transverse members by gusset plates 67.

Figure 11:
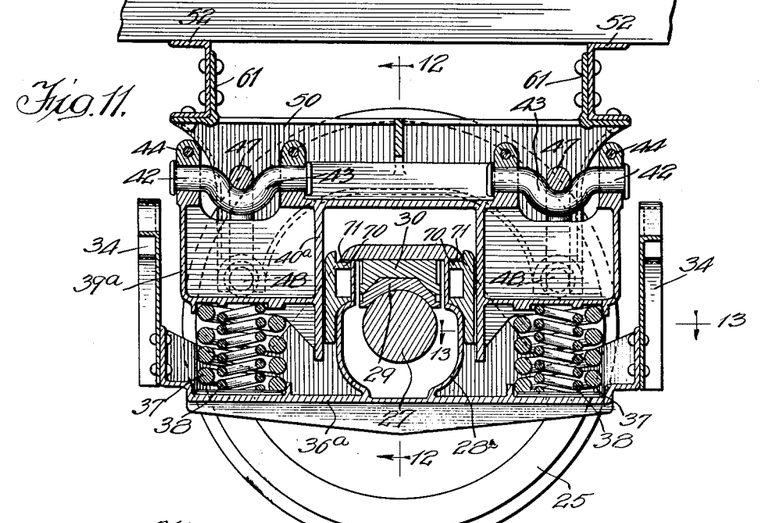
Fig. 11 is a view, similar to Fig. 6, showing a modified construction.
Figure 12:
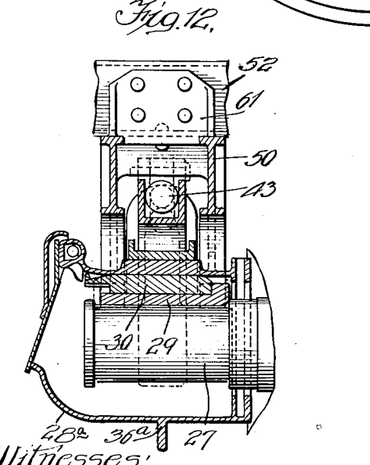
Figs. 12 and 13 are sectional views on lines 12—12 and 13—13, respectively, of Fig. 11.
Figure 13:
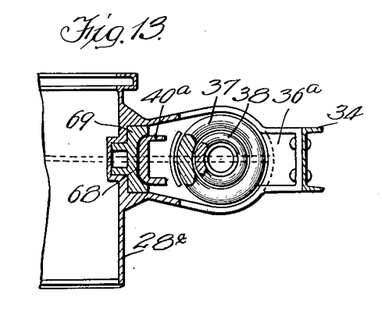

In the modified construction shown in Figs. 11, 12 and 13 the saddle casting 31 is omitted and the spring support here designated 36ᵃ is formed with a pair of channel-shaped webs 40ᵃ fitting into grooves 68 in wearing blocks 69 formed with bosses 70 fitting into recesses 71 in the sides of the journal box 28ª. The other parts of the truck are of the same construction as the corresponding parts of the truck previously described and are given the same reference numerals in the drawings.

In Figs. 14, 15 and 16 I have shown a modified form of bolster consisting of an integral casting 72 of the same general contour as the built up bolster previously described. The downwardly projecting bracket members 73 are formed integral with the rest of the bolster. Projecting from the upper side of the bolster are a pair of flanges 74 against which the side sills 75 of the car body bear.

Figure 17:
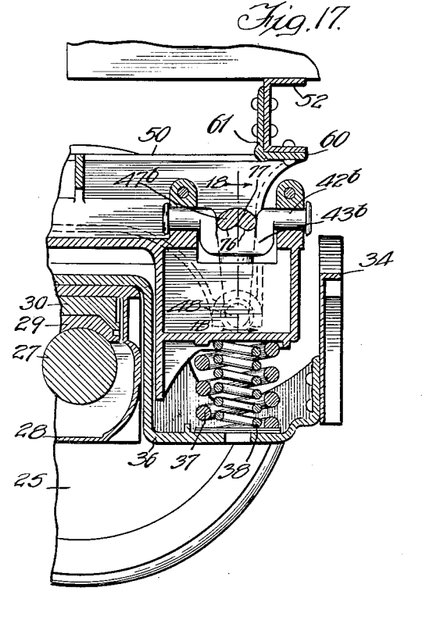
Fig. 17 is a fragmentary longitudinal sectional view illustrating a modified construction involving certain changes in the form of the hangers employed for supporting the car body on the journal boxes.
Figure 18:
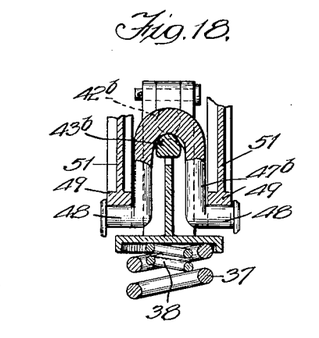
Fig. 18 is a sectional view on line 18—18 of Fig. 17.

In Figs. 17 and 18 I have shown a modification in the form of the hangers whereby the rocking movements of the hanger are accentuated, particularly with longitudinal movements of the car body, with the result that the forces resisting such movements are increased. The downturned or crank portion 43$^b$ of the horizontal hanger 42$^b$ is formed with two recesses 76 separated by a rounded projection 77 and the under surface of the curved portion of the vertical or U-shaped hanger 47$^b$ is correspondingly shaped.

Figure 19:
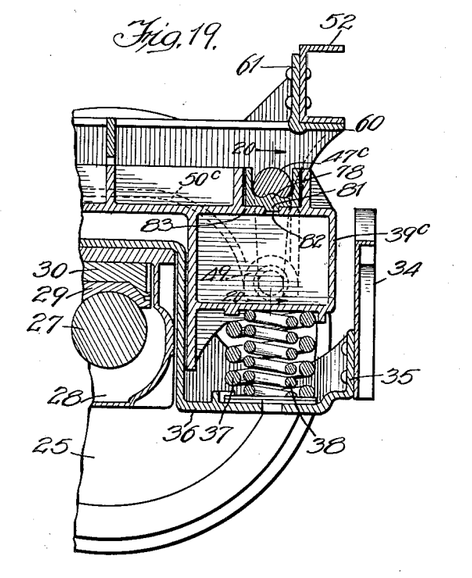
Fig. 19 is a view similar to Fig. 17 illustrating a different form of hanger construction.
Figure 20:
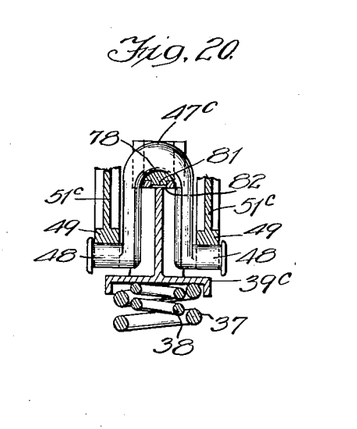
Fig. 20 is a sectional view on line 20—20 of Fig. 19.
Figure 21:
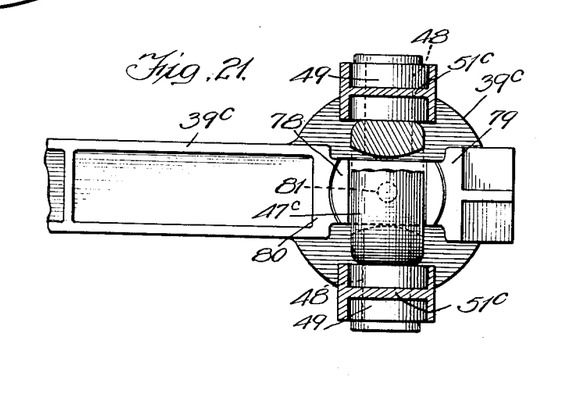
Fig. 21 is a fragmentary plan view of certain parts shown in Fig. 19.

In Figs. 19, 20 and 21 the horizontal hangers are dispensed with. The vertical hanger, in each case, here designated 47$^c$, rests in a pivot member 78 arranged in a seat formed by webs 79, 80 formed on the sliding member 39$^c$, the pivot member being preferably formed with a stud 81 which projects into an opening 82 in the horizontal web 83 of the sliding member. The flexibility of the truck is obtained through the capacity of the vertical hangers to oscillate longitudinally of the car and the capacity of the pivot members, which support the hangers, to rotate within the seats formed on the sliding member 39$^c$.

Figure 22:
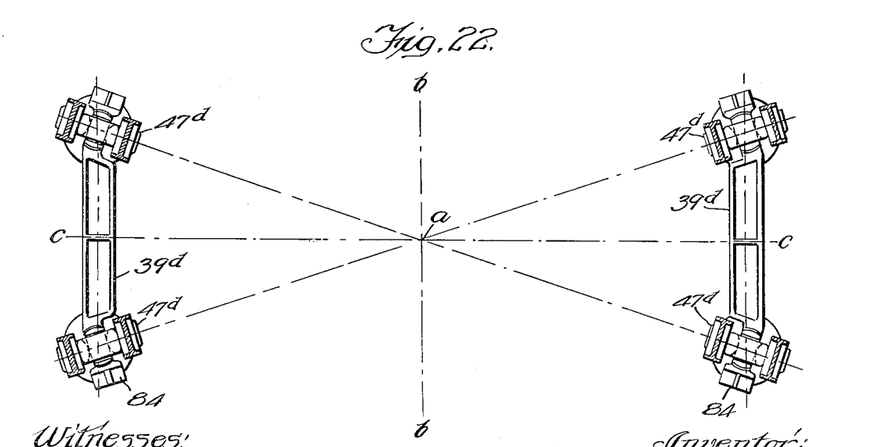
Fig. 22 is a diagrammatic view illustrating a possible modification of the construction shown in Figs. 19, 20 and 21.

Fig. 22 illustrates diagrammatically a slight modification in the hanger arrangement shown in the preceding three figures. The vertical hangers 47$^d$ are arranged so that their axes of oscillation center at a single point $a$ at the center of the car, $b$—$b$ representing the longitudinal center line of the car and $c$—$c$ the transverse center line of the truck. This arrangement is obtained by making the ends 84 of the sliding members 39$^d$ oblique to the body portions of the sliding members.

Operation: A car supported upon two of the two-wheeled trucks described as above may be much lighter than a standard car of the same size and carrying capacity. The decrease in weight makes it possible to support the car on four wheels instead of eight. The running gear of a car constructed as described will have all the flexibility necessary for passing curves. This flexibility is provided by the arrangements employed for connecting the car body, that is, the extremities of the body bolsters, to each end of each of the wheel axles. At these points there are independent flexible, elastic connections between the car body and wheel axles which permit the car body to move longitudinally of the track and also transversely thereof and the wheels and axles to adjust themselves to curvatures of the track. The car body, in fact, has a floating relation with the running gear with capacity for universal movement in a substantially horizontal plane. The movements of the car body with respect to the wheels are not, however, strictly in a horizontal plane. Because of the relation of the hangers the car body when moving longitudinally or laterally with respect to the running gear tends to rise therefrom so that as soon as the forces which have produced the longitudinal or lateral or composite movement of the body with respect to the running gear have ceased to act the car body will resume its normal position.

The truck springs also come into play in buffing and pulling. They help to absorb the buffing and pulling stresses, thereby relieving the draft gears, and assist the draft gear springs in preventing the undue shock and strain on the gears and other structures of the car. For similar reasons the truck springs absorb some of the shock which occurs when the brakes are set.

While I have shown my invention as applied to a box car it will be understood that the invention is not limited to use in this connection, nor is it limited to the details of construction shown and described.

I claim:

1. In combination with the body, wheels, axle and journal box of a railway car, of a structure for supporting the car body on the journal box comprising a supporting member and a sliding member associated with the box, cushioning means interposed between said members, and means connecting each end of said sliding member to the car body which have capacity for longitudinal and lateral movements.

2. In combination with the body, wheels, axle and journal box of a railway car, of a structure for supporting the car body on the journal box comprising a supporting member and a sliding member associated with the journal box, cushioning means interposed between said members, and a pair of pivoted hangers on each side of the journal box connecting said sliding member to the car body, the pivotal axes of which are at right angles to each other which permit longitudinal and lateral movements of the car body.

3. In combination with the body, wheels, axle and journal box of a railway car, of a structure for supporting the car body on the journal box comprising a supporting member and a sliding member associated with the box, means connecting each end of said sliding member to the car body which have capacity for longitudinal and lateral movements, and cushioning springs interposed between said members which are stressed by said movements.

4. In combination with the body, wheels, axle and journal box of a railway car, of a structure for supporting the car body on the journal box comprising a supporting member and a sliding member associated with the box, a pair of pivoted hangers on each side of the box connecting said sliding member to the car body, the pivotal axes of which are at right angles to each other which permit longitudinal and lateral movements of the car body, and a cushioning spring interposed between said members which is stressed by the oscillation of said hangers.

5. In combination with the body, wheels, axle and journal box of a railway car, of a structure for supporting the car body on the journal box comprising a supporting member and a sliding member associated with the box, a spring interposed between said members, and a pair of pivoted hangers on each side of the box connecting said sliding member to the car body, one hanger of each pair oscillating on an axis longitudinally of the car body and the other oscillating on the transverse axis.

6. In combination with the body, wheels, axle and journal box of a railway car, of a structure for supporting the car body on the journal box comprising a supporting member and a sliding member associated with the box, a spring interposed between said members, and a pair of pivoted hangers on each side of the box connecting said sliding member to the car body, one hanger of each pair oscillating on an axis longitudinally of the car body and the other supported by the first named hanger to oscillate on a transverse axis.

7. In combination with the body, wheels, axle and journal box of a railway car, of a structure for supporting the car body on the journal box comprising a spring support on each side of the box, springs on said support, a sliding member associated with the box and resting on the springs, and means connecting each end of said sliding member to the car body which have capacity for longitudinal and lateral movements.

8. In combination with the body, wheels, axle and journal box of a railway car of a structure for supporting the car body on the journal box comprising a spring support on each side of the box, springs on said support, a sliding member associated with the box and resting on the springs, and a pair of pivoted hangers on each side of the box connecting said sliding member to the car body, the pivotal axes of which are at right angles to each other which permits longitudinal and lateral movement of the car body.

9. In combination with the body, wheels, axle and journal boxes of a railway car, of a structure associated with each journal box for supporting the car body thereon comprising a supporting member and a sliding member associated with the box, cushioning means interposed between said members, and means connecting each end of said sliding member to the car body which have capacity for longitudinal and lateral movement.

10. In combination with the body, wheels, axle and journal boxes of a railway car, of a structure associated with each journal box for supporting the car body thereon comprising a spring support on each side of the box, springs on said support, a sliding member associated with the box and resting on the springs, and means on each side of the box connecting said sliding member to the car body which have capacity for longitudinal and lateral movement.

11. In combination with the body, wheels, axle and journal boxes of a railway car, of a transverse bolster secured to the body of the car, and structures for supporting opposite ends of said bolster on the journal boxes, respectively, each structure comprising a member associated with the journal box and means connecting each end of said member to the bolster which have capacity for longitudinal and lateral movement.

12. In combination with the body, wheels, axle and journal boxes of a railway car, of a transverse bolster, secured to the body of the car, and structures for supporting opposite ends of said bolster on the journal boxes, respectively, each structure comprising a member associated with the journal box, and a pair of pivoted elements on each side of the box connecting said member to the bolster, said elements having their pivotal axes at right angles with respect to each other whereby the body of the car has capacity for movement longitudinally and laterally.

13. In combination with the body, wheels, axle and journal boxes of a railway car, of a transverse bolster, secured to the body of the car, and structures for supporting opposite ends of said bolster on the journal boxes, respectively, each structure comprising a supporting member and a sliding member associated with the journal box, cushioning means interposed between said members, and means on each side of the journal box connecting said sliding member to the bolster which have capacity for longitudinal and lateral movement.

14. In a railway car the combination with the body of the car, a wheel having an axle and a journal box for the axle; of means for supporting the body on the wheel comprising a spring support associated with said box, a spring thereon, a member supported on the spring with capacity for up and down sliding movement on the box, and means connecting each end of said member to the car body whereby the body of the car is sustained on said sliding member with capacity for longitudinal and lateral movement.

15. In a railway car, the combination with the body of the car, a wheel having an axle and a journal box for the axle; of means for supporting the body on the wheel comprising a spring support associated with said box, a spring thereon, a member supported on the spring with capacity for up and down sliding movement on the box, and hangers disposed on each side of the box adapted to oscillate forwardly and backwardly and also laterally with respect to the car for supporting the car body on said sliding member.

16. In a railway car, the combination with the body of the car, a wheel having an axle and a journal box for the axle; of means for supporting the body on the wheel comprising a spring support associated with said box, a spring thereon, a member supported on the spring with capacity for up and down sliding movement on the box, and two sets of pivoted hangers oscillating on longitudinal and transverse axes, respectively, for supporting the car body on said sliding member.

17. In a railway car, the combination with the body of the car, a wheel having an axle and a journal box for the axle; of a spring support on each side of the journal box, springs on said support, a sliding member extending over and around the box and resting on said springs, and means on each side of the box for sustaining the car body on the sliding member with capacity for longitudinal and lateral movement.

18. In a railway car, the combination with the body of the car, a wheel having an axle and a journal box for the axle; of a spring support on each side of the journal box, springs on said supports, a sliding member extending over and around the box and resting on said springs, and a pair of hangers on each side of the journal box having pivotal axes at right angles to each other for sustaining the car on said sliding member.

19. In a railway car, the combination with the body of the car, a wheel having an axle and a journal box for the axle; of a spring support on each side of the journal box, springs on said supports, a sliding member extending over and around the box and resting on said springs, a pair of horizontal hangers pivoted on axes longitudinally of the car and formed with bends, a pair of vertical hangers having an oscillatory engagement at their upper ends with the bends of the first-mentioned hangers respectively, and means on the car body providing bearings for the lower ends of said vertical hangers.

20. In a railway car, the combination with the body of the car, a wheel having an axle and a journal box for the axle; of a spring support on each side of the journal box, springs on said supports, a sliding member extending over and around the box and resting on said springs, a pair of horizontal hangers pivoted on axes longitudinally of the car and formed with bends, a pair of vertical hangers having an oscillatory engagement at their upper ends with the bends of the first-mentioned hangers, respectively, and a bracket projecting downwardly from the side of the car provided with bearings for the lower ends of said vertical hangers.

21. In a railway car, the combination with the body of the car, a wheel having an axle and a journal box for the axle; of a saddle casting which fits over the axle box and is formed with spring supports on opposite sides of the box, springs on said supports, a sliding member sustained by said springs, a pair of horizontal hangers pivoted to the sliding member and formed with downward bends, a pair of vertical hangers engaging the bends of the horizontal hangers and provided at their lower ends with gudgeons, and a bracket on the car body having bearings for said gudgeons.

22. In a railway car, the combination with the body of the car, a pair of wheels, an axle therefor and journal boxes for the axle; of means for supporting opposite sides of the car body on said journal boxes, respectively, comprising in each case spring supports associated with the journal box, springs on the supports, a sliding member having up-and-down movement with respect to the box, a pair of brackets projecting downwardly from the car body at opposite sides of the box, and means for sustaining the brackets on the sliding member with capacity for movement longitudinally and laterally with respect to the running gear of the car.

23. In a railway car, the combination with the body of the car, a pair of wheels, an axle therefor and journal boxes for the axle; of means for supporting opposite sides of the car body on said journal boxes, respectively, comprising in each case spring supports associated with the journal box, springs on the supports, a sliding member having up-and-down movement with respect to the box, a pair of brackets projecting downwardly from the car body at opposite sides of the box, means for sustaining the brackets on the sliding member with capacity for movement longitudinally and laterally with respect to the running gear of the car, and transverse members connecting the spring supports on one side of the car with those on the other.

24. In a railway car, the combination with the body of the car, a pair of wheels, an axle therefor and journal boxes for the axle; of means for supporting opposite sides of the car body on said journal boxes, respectively, comprising in each case spring supports associated with the journal box, springs on the supports, a sliding member having up-and-down movement with respect to the boxes, a pair of brackets projecting downwardly from the car body at opposite sides of the box, means for sustaining the brackets on the sliding member with capacity for movement longitudinally and laterally with respect to the running gear of the car, and transverse members connecting the spring supports on one side of the car with those on the other.

25. In a railway car, the combination with the body of the car, a pair of wheels, an axle therefor and journal boxes for the axle; of means for supporting opposite sides of the car body on said journal boxes, respectively, comprising in each case a supporting member and a sliding member associated with the journal box, cushioning means interposed between said members, means on each side of the box for sustaining the car body on the sliding member with capacity for movement longitudinally and laterally, and transverse members connecting said supporting member on one side of the car with that on the other.

26. In a railway car, the combination with the body of the car, a pair of wheels, an axle therefor and journal boxes for the axle; of means for supporting opposite sides of the car body on said journal boxes, respectively, comprising in each case a spring supporting member associated with the journal box, a spring on said member, a sliding member having up and down movement with respect to the box and resting on said spring, means connecting each end of said sliding member to the car body which have capacity for longitudinal and lateral movement, and a transverse member connecting the spring support on one side of the car with that on the other.

27. In a railway car, the combination with the body of the car, a pair of wheels, an axle therefor, and journal boxes for the axle; of a transverse bolster rigidly connected with the car body on the underside thereof and provided at each end with a downwardly projecting bracket member provided with a pair of brackets, one on each side of the journal box; spring supports associated with said journal boxes; springs on said supports; sliding members having up-and-down movement with respect to the journal boxes, and a pair of hangers mounted on each sliding member on opposite sides of the journal boxes, each having capacity for oscillation on axes at right angles to each other which engage the bearings on said bracket members so as to support the car body.

28. In a railway car, the combination with the body of the car, a pair of wheels, an axle therefor, and journal boxes for the axle; of a transverse bolster rigidly connected with the car body and comprising two metal elements angular in cross-section, the center portions of which are close together and are fastened one to the other, and the ends spread apart, and bracket members projecting downwardly from the ends of the bolster, spring supports associated with said journal boxes; springs on said supports; sliding members having up-and-down movement with respect to the journal boxes, and means for sustaining said bracket members on the sliding members so that the car body may move longitudinally and transversely with respect to its running gear.

29. In a railway car, the combination with the body of the car, a pair of wheels, an axle therefor, and journal boxes for the axle; of a transverse bolster rigidly connected with the car body and comprising two metal elements, the center portions of which are close together and are fastened one to the other, and the ends spread apart, supporting and sliding members associated with said journal boxes, cushioning means interposed between said members, and means for sustaining the ends of said bolster on said sliding members so that the car body may move longitudinally and transversely with respect to its running gear.

30. In a railway car, the combination with the car body, wheels and axle; of a journal box having spring seats cast on opposite sides of the same, springs on said seats, a sliding member supported on said springs, wear blocks interpoed between the sliding member and the journal box, a pair of horizontal hangers pivoted to the sliding member on opposite sides of the journal box, a pair of U-shaped vertical hangers having outwardly projecting gudgeons at their lower ends with the upper ends engaging said horizontal hangers, and a bracket on the car body having bearings for the gudgeons on the vertical hangers.

31. In a railway car, the combination with the car body of a pair of wheels at each end of the car body, axles connecting the same, and a structure associated with the end of each axle for supporting the car body thereon comprising a bearing element, a sliding element, cushioning means interposed between said elements, and means on each side of the axle connecting the sliding element to the car body, whereby the car body has capacity for movement longitudinally and transversely with respect to the axles.

32. In a railway car, the combination with the car body of a pair of wheels at each end of the car body, axles connecting the same, and a structure associated with the end of each axle for supporting the car body thereon comprising a bearing element, a sliding element, cushioning means interposed between said elements, and a pair of pivoted hangers on each side of the axle connecting said sliding element to the car body, the pivotal axes of which are at right angles to each other which permit longitudinal and lateral movement of the car body.

33. In a railway car, the combination with the car body of a pair of wheels at each end of the car body, axles connecting the same, and a structure associated with the end of each axle for supporting the car body thereon comprising a spring supporting member and a sliding member associated with the axle, cushioning springs interposed between said members, and a pair of pivoted hangers connecting each end of the sliding member to the car body whereby the car body has capacity for movement longitudinally and transversely with respect to the axles.

34. In a railway car, the combination with the body of the car, a wheel having an axle and a journal box for the axle; of means for supporting the body on the wheel comprising a spring support associated with said box, a spring thereon, a member supported on the spring with capacity for up and down sliding movement on the box, a hanger engaged with the car body formed with two curved bearing surfaces in contact with the sliding member on one or the other of which the hanger oscillates when the car body moves with the longitudinal movement of the car body in one or the other direction.

35. In a railway car, the combination with the body of the car, a wheel having an axle and a journal box for the axle; of means for supporting the body on the wheel comprising a spring support associated with said box, a spring thereon, a member supported on the spring with capacity for up and down sliding movement on the box, a hanger having horizontal bearings on said sliding member and provided with a cranked portion formed with two curved recesses, and an inverted U-shaped hanger, the lower extremities of which are engaged with the car body and the upper portion of which is formed with a pair of bearing surfaces to fit the curved recesses in the horizontal hanger.

36. In a railway car, the combination with the body of the car, a wheel having an axle and a journal box for the axle; of means for supporting the body on the wheel comprising a spring support associated with said box, a spring thereon, a member supported on the spring with capacity for up and down sliding movement on the box, a pivot member rotatably mounted on said sliding member to turn on a vertical axis, and an inverted U-shaped hanger seated on the pivot member with capacity for oscillation in directions longitudinal of the car, the lower ends of said member being engaged with the car body to support the same.

37. In a railway car, the combination with the body of the car, a pair of wheels having an axle terminating in journals and journal boxes for said journals; of means for supporting the car body on said journal boxes which comprises a pair of members slidably and elastically mounted on the journal boxes, a pair of pivot members at each end of each sliding member adapted to rotate on vertical axes, and four inverted U-shaped hangers, one for each pivot member, the lower extremities of which are engaged with the car body, said hangers adapted to oscillate on axes which intersect at the center line of the car.

38. In a railway car, the combination of the body of the car, a wheel having an axle, a journal box for the axle, the lower portion of which is provided with outstanding longitudinal flanges, a saddle casting which fits over the axle box and is adapted to bear against said flanges, spring supports on the saddle casting at opposite sides of the box, springs on said supports, a sliding member sustained by said spring, a pair of horizontal members pivoted to the sliding member and formed with downward bends, a pair of vertical hangers engaging the bends of the horizontal members and formed at their lower ends with gudgeons, and a bracket on the car body having bearings for said gudgeons.

GARTH GRIFFITH GILPIN.